(12) United States Patent
Aldajani

(10) Patent No.: US 7,949,503 B2
(45) Date of Patent: May 24, 2011

(54) FACILITIES OPTIMIZATION METHOD

(75) Inventor: Mansour A. Aldajani, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 540 days.

(21) Appl. No.: 12/216,517

(22) Filed: Jul. 7, 2008

(65) Prior Publication Data
US 2010/0004905 A1 Jan. 7, 2010

(51) Int. Cl.
*G06F 17/10* (2006.01)
*H04W 24/00* (2009.01)
(52) U.S. Cl. .................... 703/6; 703/2; 455/423
(58) Field of Classification Search .......... 703/2, 6; 455/423
See application file for complete search history.

(56) References Cited

U.S. PATENT DOCUMENTS

| | | | |
|---|---|---|---|
| 5,285,494 A * | 2/1994 | Sprecher et al. | 455/423 |
| 5,465,390 A * | 11/1995 | Cohen | 455/446 |
| 5,475,870 A | 12/1995 | Weaver, Jr. et al. | |
| 5,561,841 A | 10/1996 | Markus | |
| 5,828,962 A * | 10/1998 | Ho-A-Chuck | 455/446 |
| 6,041,236 A * | 3/2000 | Bernardin et al. | 455/446 |
| 6,094,580 A * | 7/2000 | Yu et al. | 455/446 |
| 6,405,046 B1 | 6/2002 | Kumaran et al. | |
| 6,539,221 B1 * | 3/2003 | Vasudevan et al. | 455/423 |
| 6,674,403 B2 * | 1/2004 | Gray et al. | 342/463 |
| 6,711,404 B1 | 3/2004 | Arpee et al. | |
| 6,834,180 B1 | 12/2004 | Marshall | |
| 7,035,632 B2 * | 4/2006 | Gutowski | 455/423 |
| 7,155,244 B2 * | 12/2006 | Edge | 455/502 |
| 7,184,770 B1 | 2/2007 | Narasimhan et al. | |
| 7,313,391 B2 * | 12/2007 | Gutowski | 455/423 |
| 2001/0041565 A1 * | 11/2001 | Vicharelli et al. | 455/423 |
| 2002/0063656 A1 * | 5/2002 | Gutowski | 342/360 |
| 2003/0043073 A1 * | 3/2003 | Gray et al. | 342/465 |
| 2004/0214577 A1 | 10/2004 | Borst et al. | |
| 2005/0037786 A1 * | 2/2005 | Edge | 455/502 |
| 2005/0075104 A1 * | 4/2005 | Jain et al. | 455/423 |
| 2005/0254455 A1 | 11/2005 | Plehn et al. | |

(Continued)

FOREIGN PATENT DOCUMENTS
WO WO 2007/078467 A2 7/2007

OTHER PUBLICATIONS

Charles D. Norton, Boleslaw K. Szymanski, Viktor K. Decyk, "Object-Oriented Parallel Computation for Plasma Simulation", Communications of the ACM, Oct. 1995/vol. 38, No. 10, pp. 88-100.*

L. Greengard, V. Rokhlin, "A Fast Algorithm for Partical Simulations", Journal of Computational Physics, 135, 280-292 (1997) Article No. CP975706 pp. 280-292.*

*Primary Examiner* — Dwin M Craig

(74) *Attorney, Agent, or Firm* — Richard C. Litman

(57) ABSTRACT

The facilities optimization method utilizes Coulomb's law to model placement of facilities relative to a population using the facilities. The natural phenomenon of electrical charge attraction and repulsion can be used to model a wide variety of facility layout and planning problems. The physical phenomenon of charge interaction is simulated and used to effectively find a solution for a facilities supply-demand problem. Utilizing the charge model, problem solutions are naturally reached and are self-adjusting in response to parameter changes in the problem. A methodology for static, dynamic, elastic or inelastic demand is provided. The charge simulation approach supports any distance metric. The method always provides a solution regardless of the initial conditions used. The method provides high flexibility in choosing arbitrary demand and supply patterns.

13 Claims, 16 Drawing Sheets

U.S. PATENT DOCUMENTS

| | | | |
|---|---|---|---|
| 2006/0095474 A1* | 5/2006 | Mitra et al. | 707/104.1 |
| 2006/0240835 A1* | 10/2006 | Jain et al. | 455/446 |
| 2008/0285505 A1* | 11/2008 | Carlson et al. | 370/328 |
| 2008/0287139 A1* | 11/2008 | Carlson et al. | 455/456.1 |
| 2009/0131073 A1* | 5/2009 | Carlson et al. | 455/456.1 |
| 2009/0287139 A1* | 11/2009 | Roy | 604/20 |

* cited by examiner

FACILITIES OPTIMIZATION METHOD

BACKGROUND OF THE INVENTION

1. Field of the Invention

The present invention relates to computerized statistical or combinatorial procedures and methods, and particularly to a facilities optimization method implemented on a computer for selecting efficient facility locations based on supply and demand laws.

2. Description of the Related Art

Facility layout and planning is an important topic that has a wide variety of applications in real life. Both private and public sectors are often faced with problems involving facility layout decisions. Facility location, for example, is concerned with the finding the best locations for facilities based on supply-demand requirements. This problem has many applications in real life including locating retail stores, schools, hospitals, ambulance bases, fire stations, automatic teller machines, gas stations and wireless base stations.

Design parameters of the facility location problem include how many facilities should be sited, where should each facility be located, how large each facility should be, and how should demand be allocated.

Modeling of the facility location problem has been investigated widely in the literature. Persons having ordinary skill in the art have categorized the problem into different types of models including set covering, maximum covering, P-center and P-Median models. Models can also be planar, network, or discrete. Static as well as dynamic models are also considered in the literature. In static models the inputs to the problem do not change with time while in dynamic models, the inputs are dependent on time.

Other categories of the location problem involve elastic versus inelastic demand, capacitated versus uncapacitated facility, deterministic versus probabilistic models. Different distance metrics are considered in these models, including the Manhattan (right-angle), Euclidean (straight-line), and $l_p$ metrics.

Solution of the facility location problem has also been discussed extensively in the literature. Linear and integer programming are used widely to solve location problems. Other common approaches well known to practitioners of ordinary skill are used, including tabu search, simulated annealing and genetic algorithm. These approaches show a considerable amount of success in solving particular location problems. However, every one of these approaches has its own limitation. Some of these approaches are difficult to understand and implement, requiring an expert's input. In addition, the formulation of the problem in most of these methods is not straight-forward. Furthermore, they all tend to have high computation cost especially for problems with large dimension. Finally, a solution is not always guaranteed and may be sensitive to the modeling parameters.

Thus, a facilities optimization method solving the aforementioned problems is desired.

SUMMARY OF THE INVENTION

The facilities optimization method utilizes Coulomb's law to model placement of facilities relative to a population using the facilities. The natural phenomenon of electrical charge attraction and repulsion can be used to model a wide variety of facility layout and planning problems. The physical phenomenon of charge interaction is simulated and used to effectively find a solution for a facilities supply-demand problem. Utilizing the charge model, problem solutions are naturally reached and are self-adjusting in response to parameter changes in the problem. A methodology for static, dynamic, elastic or inelastic demand is provided. The charge simulation approach supports any distance metric. The method always provides a solution regardless of the initial conditions used. The method provides high flexibility in choosing arbitrary demand and supply patterns.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is best understood by reference to FIGS. 1-15. Analogies between the supply-demand problem and the concept of charged-particle interaction are provided infra. It should be understood that in this document, any formulaic reference to charge, which in textbooks is normally notated as Q, shall be notated as g. Sensitivity analysis and design considerations are also discussed. A preferred embodiment is described on a practical supply-demand problem utilizing the method 20 shown in FIG. 2.

Figure 1:
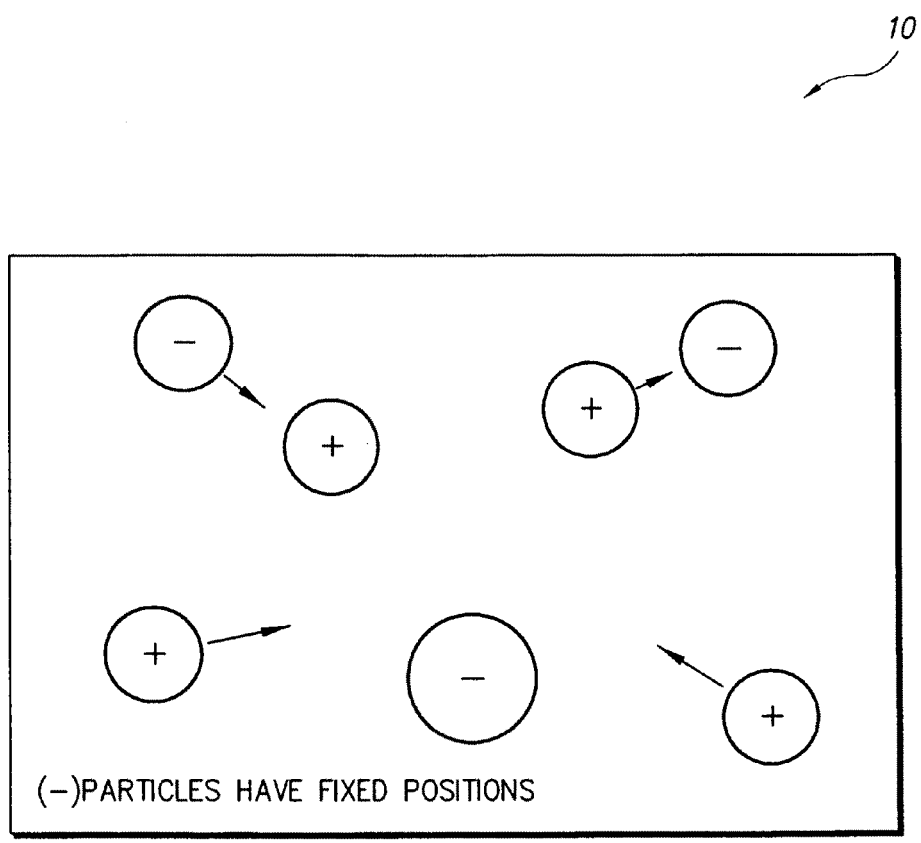
FIG. 1 is a schematic diagram showing interaction between electrically charged particles.

FIG. 1 shows some electrically charged particles 10 located in a confined space. Some of these particles have positive charges while others have negative charges. As a result, each of the particles will start moving affected by the attractive and repulsive forces from other particles. The particles will eventually come to rest when the net force exerted on each of them is zero. Such a state is known as the equilibrium.

In general, the service supplying facility, and the user demand point can be thought of as a positive particle and a negative particle, respectively. The level of service at a certain point inside the space is then represented by the net strength of the electric field at that point. Using this analogy, we can model the facility location problem as a charged-particle interaction problem. Naturally, negative particles (the demand points) will be of fixed positions while positive particles (the supply facilities) will be free to move until they eventually reach equilibrium positions.

One of the features of this approach is that it will always reach a state of equilibrium no matter from what initial points we start. Secondly, the forces naturally guide the particles to the equilibrium points without intervention from the user. Furthermore, the particles will take a relatively short path to reach a steady state. These features make this concept attractive in solving facility location problems.

Forces between the charged particles can be described by the well-known Coulomb's law. According to this law, the magnitude of the force between two particles i and j can be expressed as $$|f_{ij}| = \frac{kg_i g_j}{h_{ij}^2} \quad (1)$$

where $g_i$ and $g_j$ are the amounts of charge for particles i and j respectively and k is the degradation factor. The parameter $h_{ij}$ is the distance between the two particles.

Another form for the force magnitude is to write $$|f_{ij}| = \begin{cases} \frac{kg_i g_j}{h_{ij}^2}, & \arg\max_w \left\{\frac{kg_w g_j}{h_{wj}^2}\right\} = i \\ 0, & \text{Otherwise} \end{cases} \quad (2)$$

This form is useful in coming up with more precise solution for the maximum covering problem. According to this expression, the negative particle attracts only one positive particle that has the highest power. Many other forms of the force magnitude can be generated to represent different practical scenarios.

The direction of the force is given by the unity vector $$u_{ij} = \frac{1}{(x_i - x_j)^2 - (y_i - y_j)^2}[(x_i - x_j)(y_i - y_j)] \quad (3)$$

The net force applied to particle i is the summation of force vectors from all other particles, i.e., $$f_i = \Sigma_{j=[1,M], j \neq i} |f_{ij}| u_{ij} \quad (4)$$

where M is the total number of particles. These forces will cause the freely moving positive particles to accelerate in different directions. In this study, the equation of motion is solved using a first-order approximation. The velocity of particle i is given by $$v_i(t+\Delta) = v_i(t) + a_1 f_i(t) \quad (5)$$

whereas the displacement is given by:

$$p_i(t+\Delta) = p_i(t) + a_2 v_i(t) \quad (6)$$

where t is time and $\Delta$ is the step-size. The constants $a_1$ and $a_2$ depend on the step-size and other motion parameters. Eventually, each of the particles will reach its equilibrium point at which the net force is zero. We will show in the sensitivity analysis section that the equilibrium points are unique.

One objective of the coverage problem is to find the minimum number of facilities and their locations such that the service level all over the entire space $\Gamma$ is at least equal to a constant threshold $\alpha$. In other words, the location problem can be written as:

$$\min N \quad (7)$$

such that:

$$r(x,y) \geq \alpha \quad \forall x,y \in \Gamma \quad (8)$$

where N is the number of facilities and r(x,y) is the net service level offered at the point with coordinates (x,y).

To find an expression for r(x,y), let us define the quantity $s_i(x,y)$ as the amount of coverage supplied by the $i^{th}$ facility to the demand point at location (x,y). This quantity indicates simply the service level at location (x,y) due to facility i. It can be expressed in many forms depending on the problem at hand. When the Euclidian metric is used, this quantity is usually represented by circular contour lines with magnitude that decays as we move away from the facility. In other words, $$s_i(x, y) = G_i \left(\frac{1}{h_i(x, y)}\right)^2 \quad (9)$$

where $h_i(x,y)$ is the distance between facility i and the point (x,y) and $G_i$ is the coverage gain for this facility. More sophisticated forms of $s_i(x,y)$ can be constructed to include more modeling parameters such as response time and capacity.

The quantity d(x,y) is defined as the demand value at location (x,y). The demand values will be represented in simulations by the amount of charge carried by the negative particles.

Therefore, we can write r(x,y) as the difference between supply and demand. When the service level at point (x,y) is taken as the summation of service levels at that point from all facilities, then we write $$r(x,y) = \Sigma_{i=1}\{s_i(x,y)\} - d(x,y) \quad (10)$$

Such a scenario exists, for example, when the facilities provide identical service. The second form for r(x,y) is when each demand point has to be covered satisfactorily by at least one of the facilities. In this case, r(x,y) becomes $$r(x,y) = \max\{s_i(x,y)\} - d(x,y) \quad (11)$$

According to (8), expression (11) is saying that the maximum service level at point (x,y) out of all facilities should exceed the demand at that point by the amount α. Using the same concept, one can come up with other alternative expressions for r(x,y).

Figure 2:
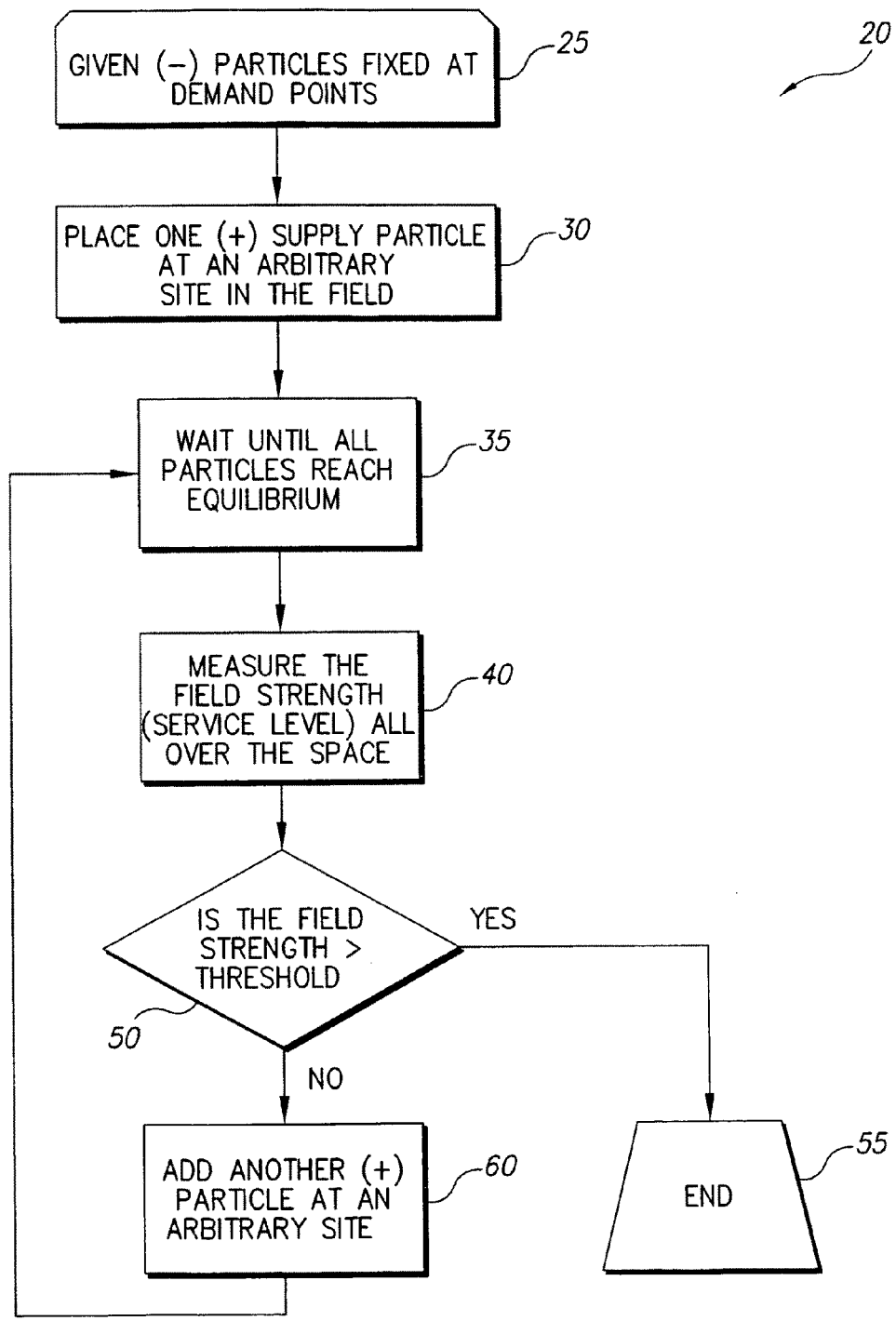
FIG. 2 is a flowchart showing a procedure implementing the facilities optimization method according to the present invention.

To solve the models above, we refer to the forces analogy described supra. The facilities optimization method is shown in FIG. 2. Given the negative demand particles at fixed positions (as shown at step 25), we start at step 30 by placing one positive particle at an arbitrary site inside the field. Following the equations of motion (4-6), the positive particle will start moving towards the demand particles by the force of attraction. At step 35 the particle finally reaches its equilibrium position. Then, at step 40 we measure the net field strength (service level) all over the area using (10) or (11). If this quantity is above the threshold α for all points we stop at step 55. Otherwise, at step 60, a second positive particle is placed at an arbitrary site and the process is repeated.

As mentioned earlier, the facilities optimization method provides high flexibility in choosing arbitrary demand and coverage patterns. It should be understood that the demand points are represented by fixed-position negative particles while the facilities are represented by the positive particles. In principle, any number and distribution of these particles can be constructed. In addition, the amount of charge for these particles can have any value reflecting the demand values and coverage levels.

To simplify the design of the demand patterns, a graphic user-interface (GUI) software was designed for this purpose. The software can read the demand patterns directly from a geographic map with special color codes. Each color on the map means a certain demand level. The designer can color the map with the corresponding color codes depending on the demand levels at the different positions on the map. The software will then interpret the colored map and construct the demand points. This software is used in the case study of applying the inventive method to a real life problem infra.

Color codes can represent priority levels, population density, service categories, etc. The color codes may also represent a combination of more than one of these parameters. Table I, shows an example of such a code table.

On the other hand, the designer can set the amount of coverage for each facility by choosing suitable coverage gain $G_i$ in (9). In this study, we assume that $G_i$ is the same for all facilities.

Simulations have been carried out on a Pentium II computer with 256 MB of RAM. MATLAB® is used as the development and simulation environment. Persons having ordinary skill in the art will recognize that the simulations may be carried out on any type of computation machine. Moreover, the use of MATLAB® is merely exemplary and not a limitation with respect to the type of mathematics software that may be used to carry out the simulations. The developed software implements the algorithm shown in FIG. 2. The software visually simulates the movement of the charged particles based on the equations of motion (4-6).

The distance metric used throughout the simulation is the Euclidian metric. The parameters of the equation of motion $a_1$ and $a_2$ are chosen arbitrarily as 0.01. A stopping criterion for the motion of the particles is when the norm of their total net forces becomes less than 0.0001 or when the number of iterations exceeds 250.

Figure 3:
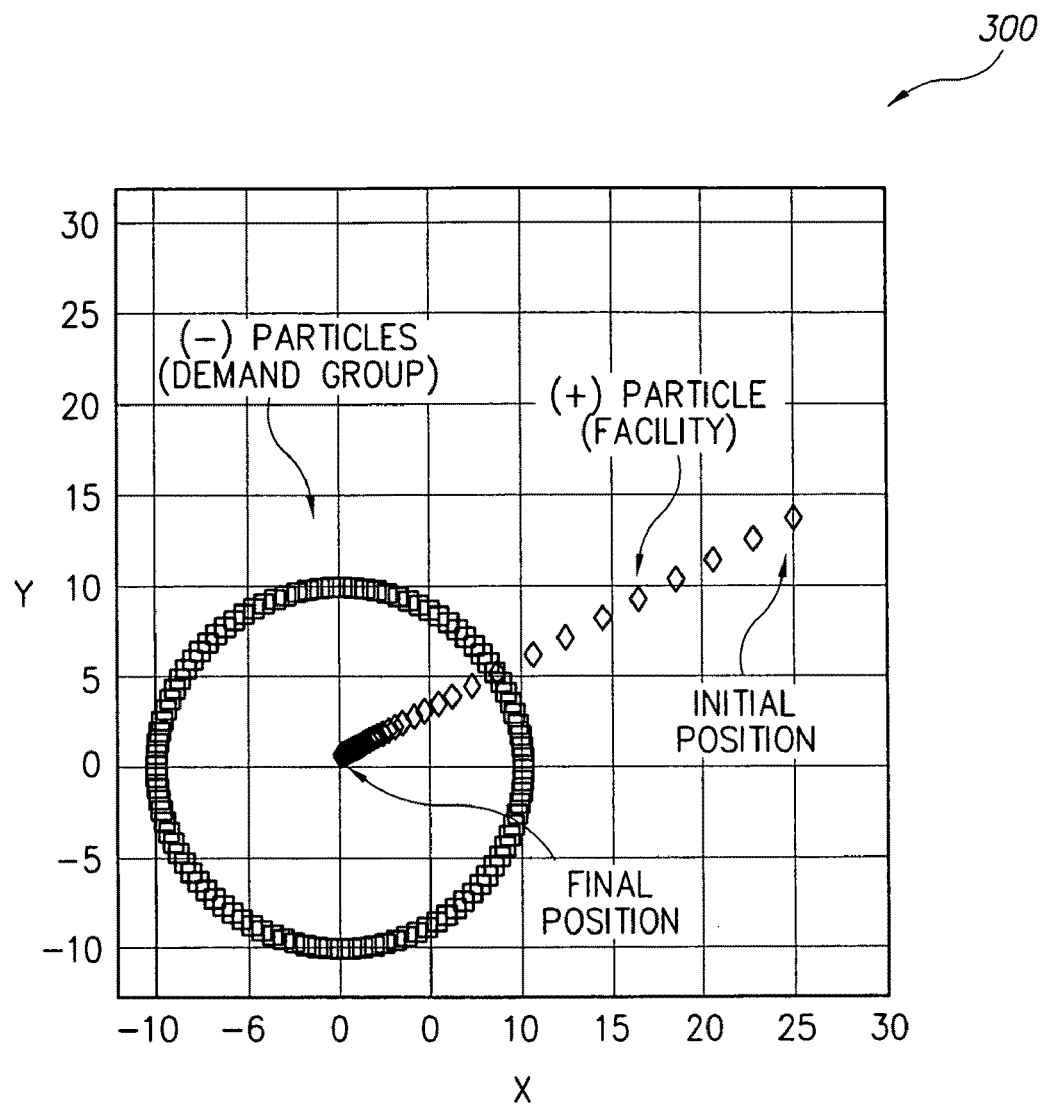
FIG. 3 is a chart graphically illustrating attraction of as facility by demand.
Figure 4:
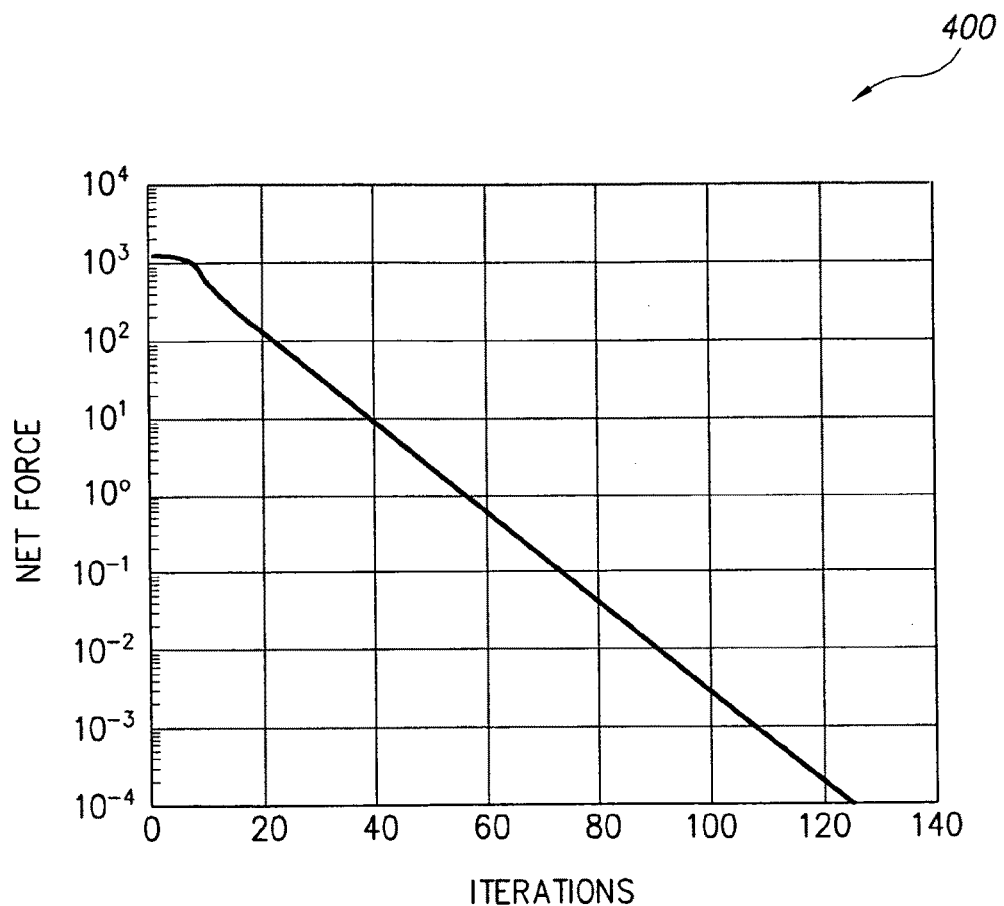
FIG. 4 is a graph showing net force exerted on the positive particle (facility) of FIG. 3.
Figure 5:
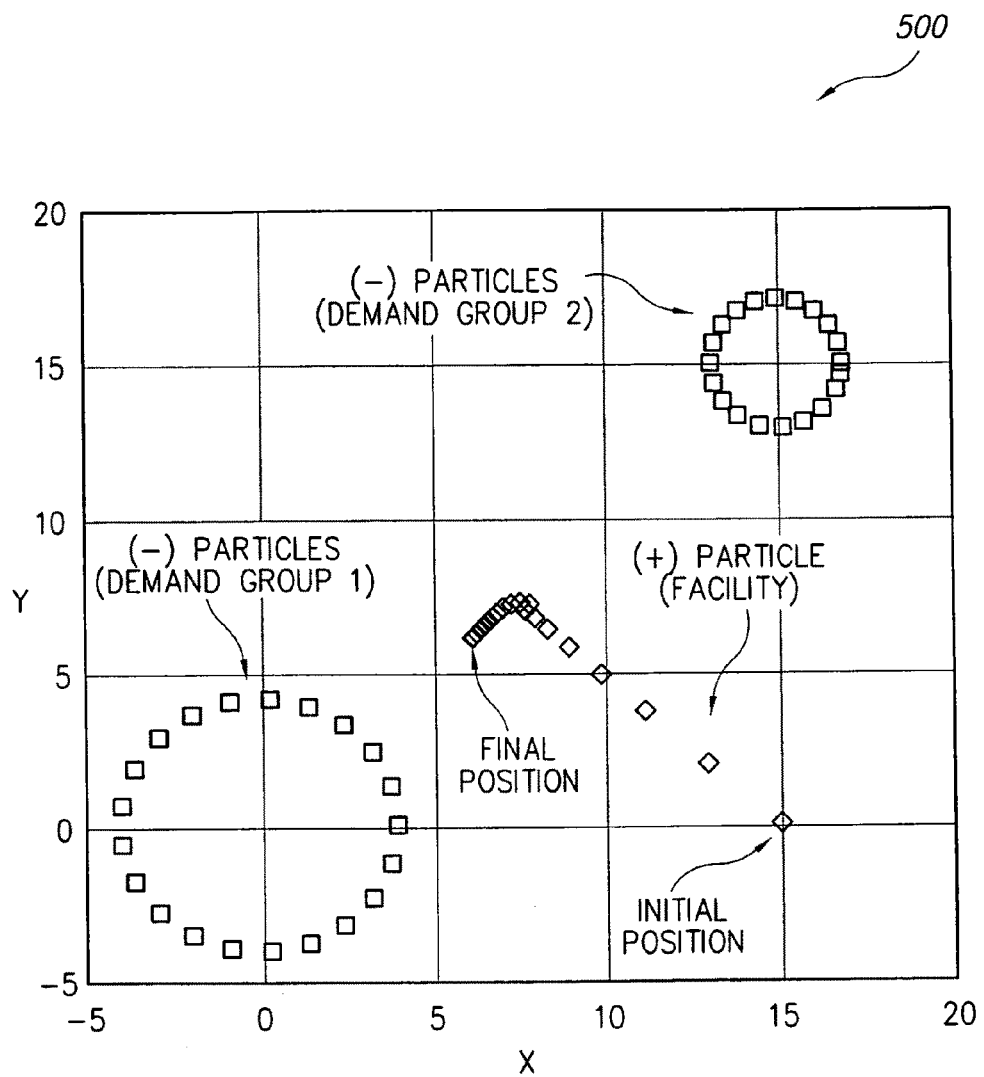
FIG. 5 is a graph showing positive particle movement towards two demand groups of the facilities optimization method according to the present invention.

The developed simulation for the behavior of the charged-particles is implemented on a simple illustrative example. We first consider the case 300 of one positive particle and a group of negative particles as shown in FIG. 3. The positive particle was placed in an arbitrary initial location. This particle started to move towards the negative particles by the force of attraction. As expected, this particle reached a point right at the center-of-mass of the negative particles. The curve of the net force exerted on the positive particle is shown in the graph 400 of FIG. 4. Clearly, the net force is decaying to zero indicating that the particle is converging to an equilibrium position.

Figure 6:
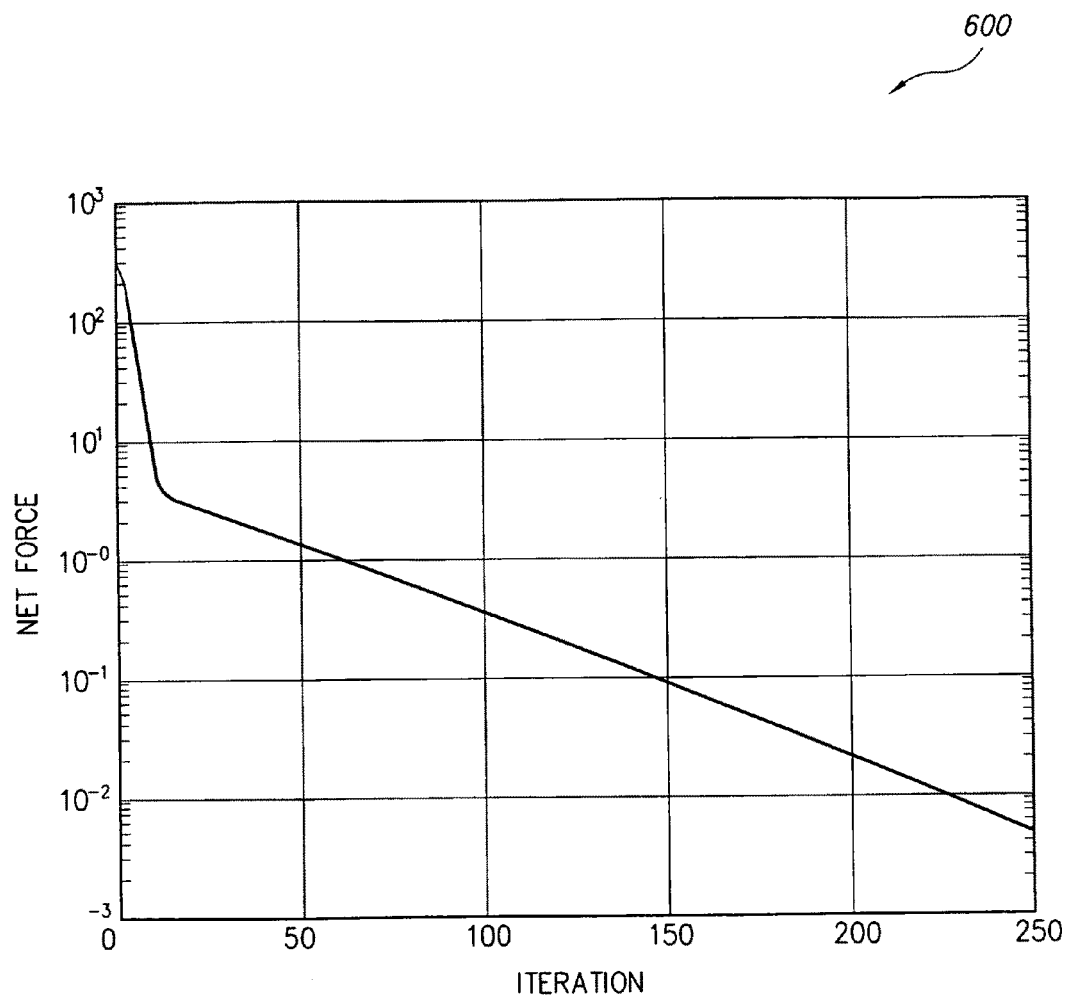
FIG. 6 is a graph showing net force exerted on the positive particle in FIG. 5 of the facilities optimization method according to the present invention.

In another experiment, we consider one positive particle with two groups of negative particles. The results are shown in field plot 500 of FIG. 5. Again, the positive particle starts to move from its initial location until it settles in between the two groups of negative particles. As expected, the final location of the positive particle is closer to the larger mass of negative particles. The net force exerted on the positive particle is shown in FIG. 6 where convergence to an equilibrium position is evident.

Figure 7:
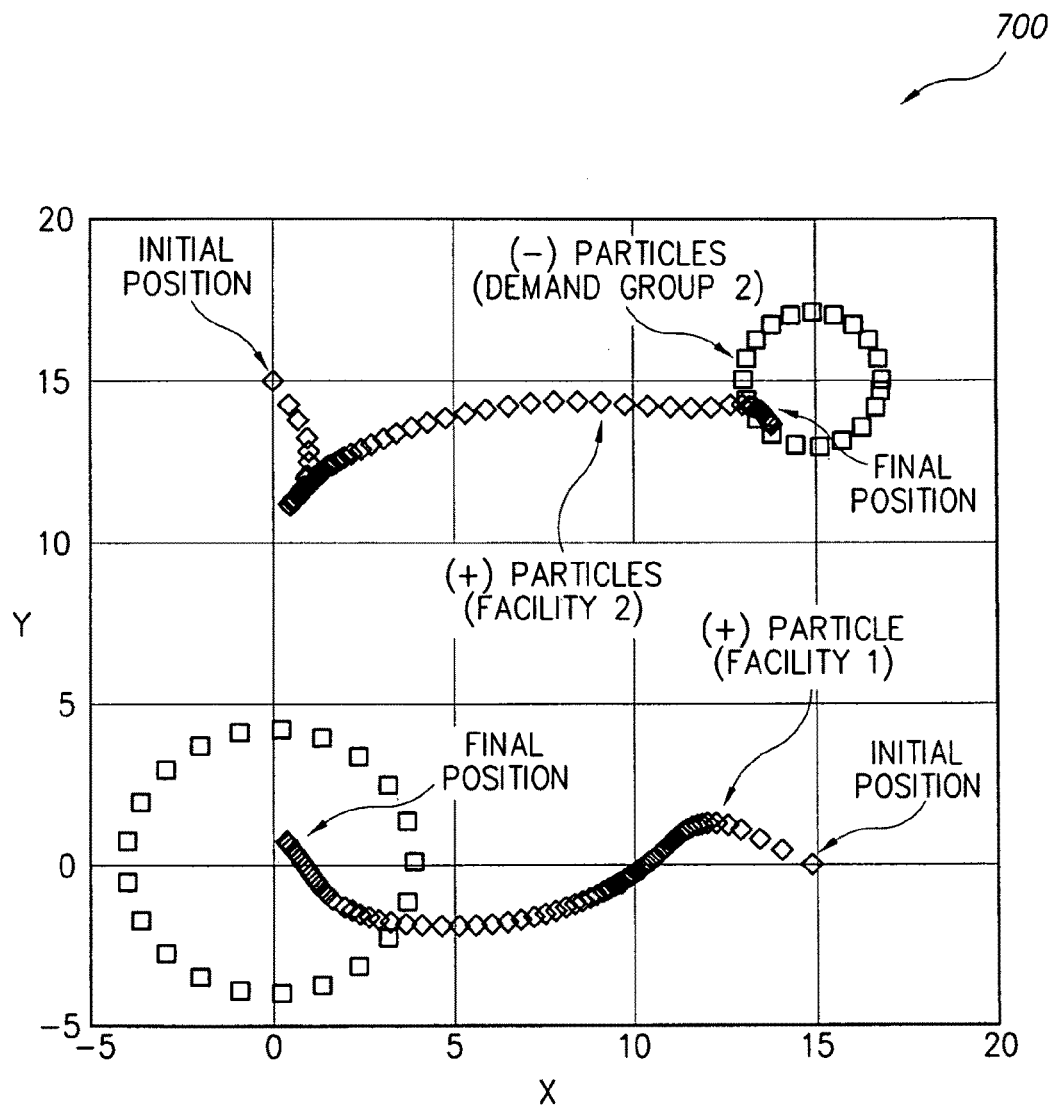
FIG. 7 is a graph showing two supply particles and two demand groups of the facilities optimization method according to the present invention.
Figure 8:
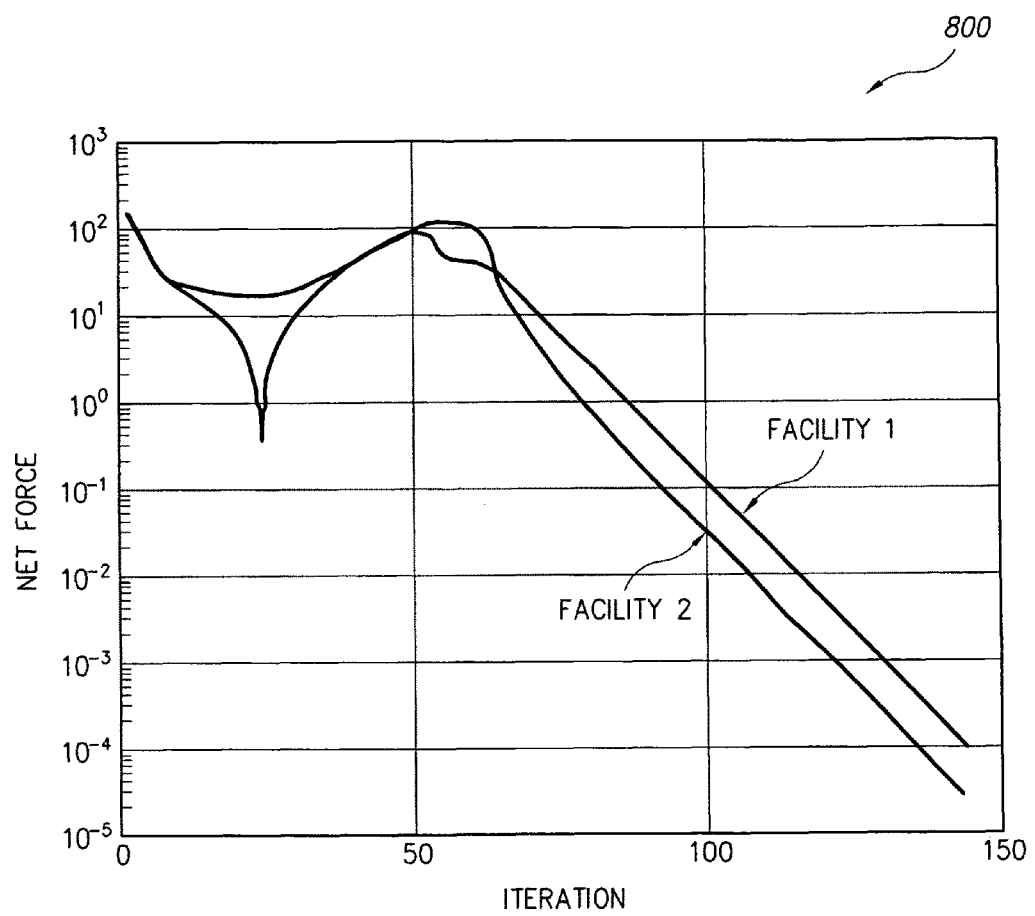
FIG. 8 is a graph showing net forces exerted on the two positive particles in FIG. 7 of the facilities optimization method according to the present invention.
Figure 9:
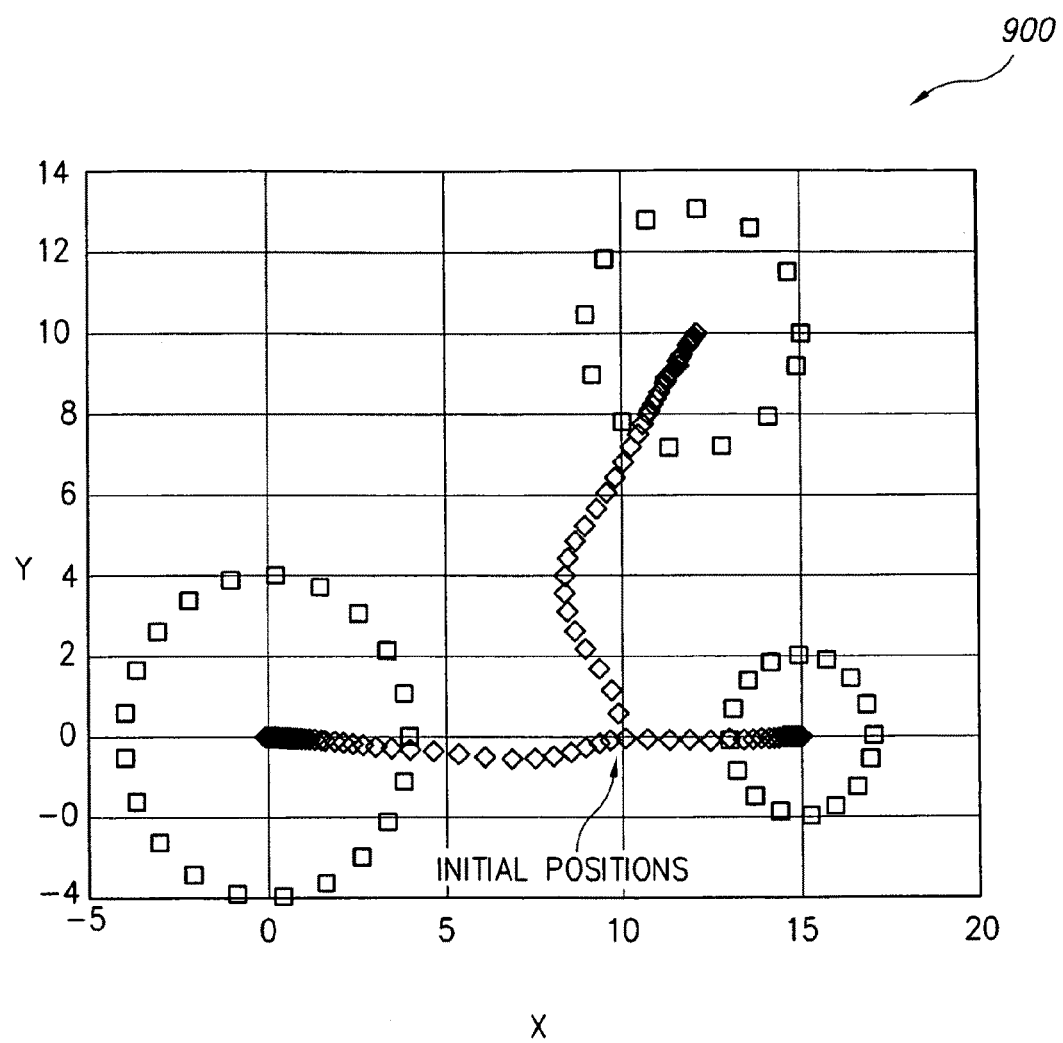
FIG. 9 is a graph showing three supply particles and three demand groups of the facilities optimization method according to the present invention.
Figure 10:
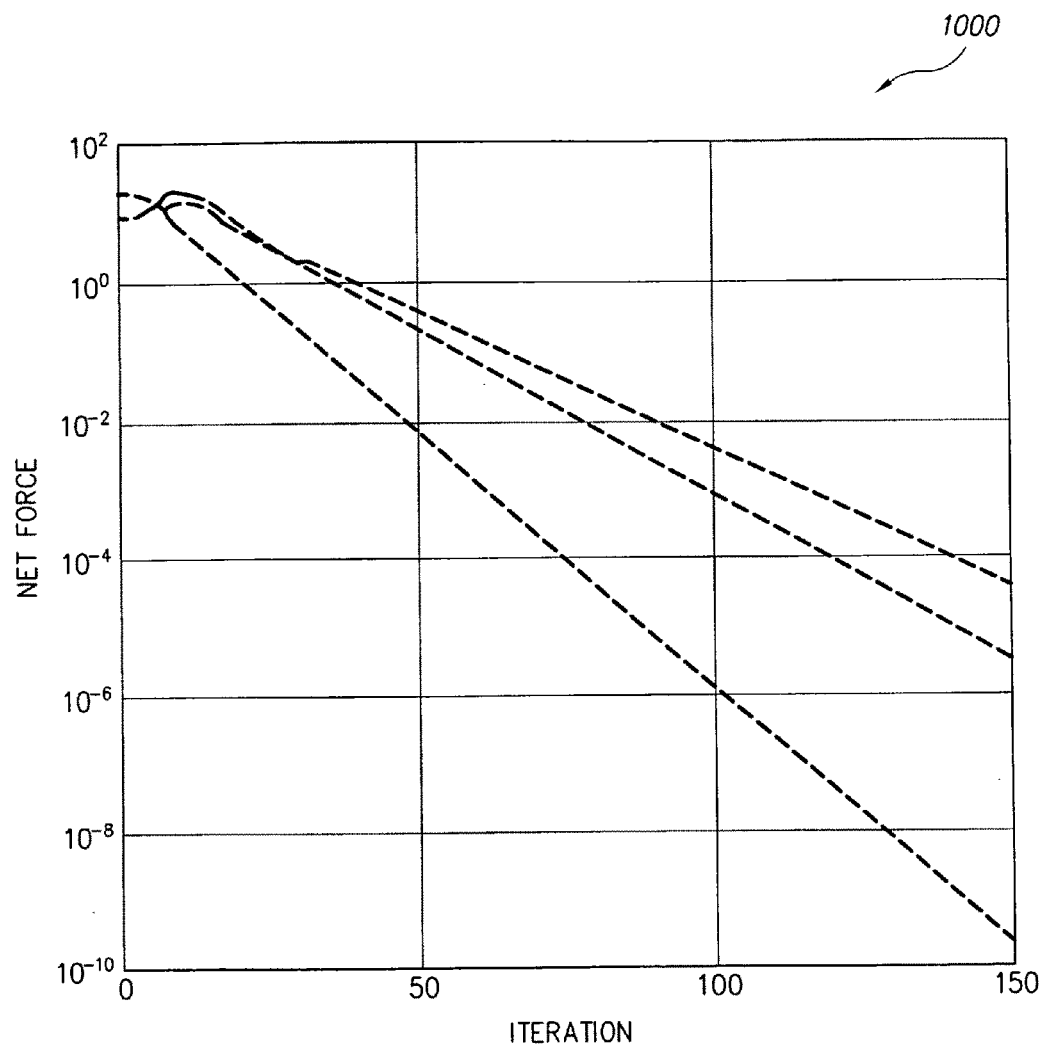
FIG. 10 is a graph showing net forces exerted on the three positive particles in FIG. 9 of the facilities optimization method according to the present invention.
Figure 11:
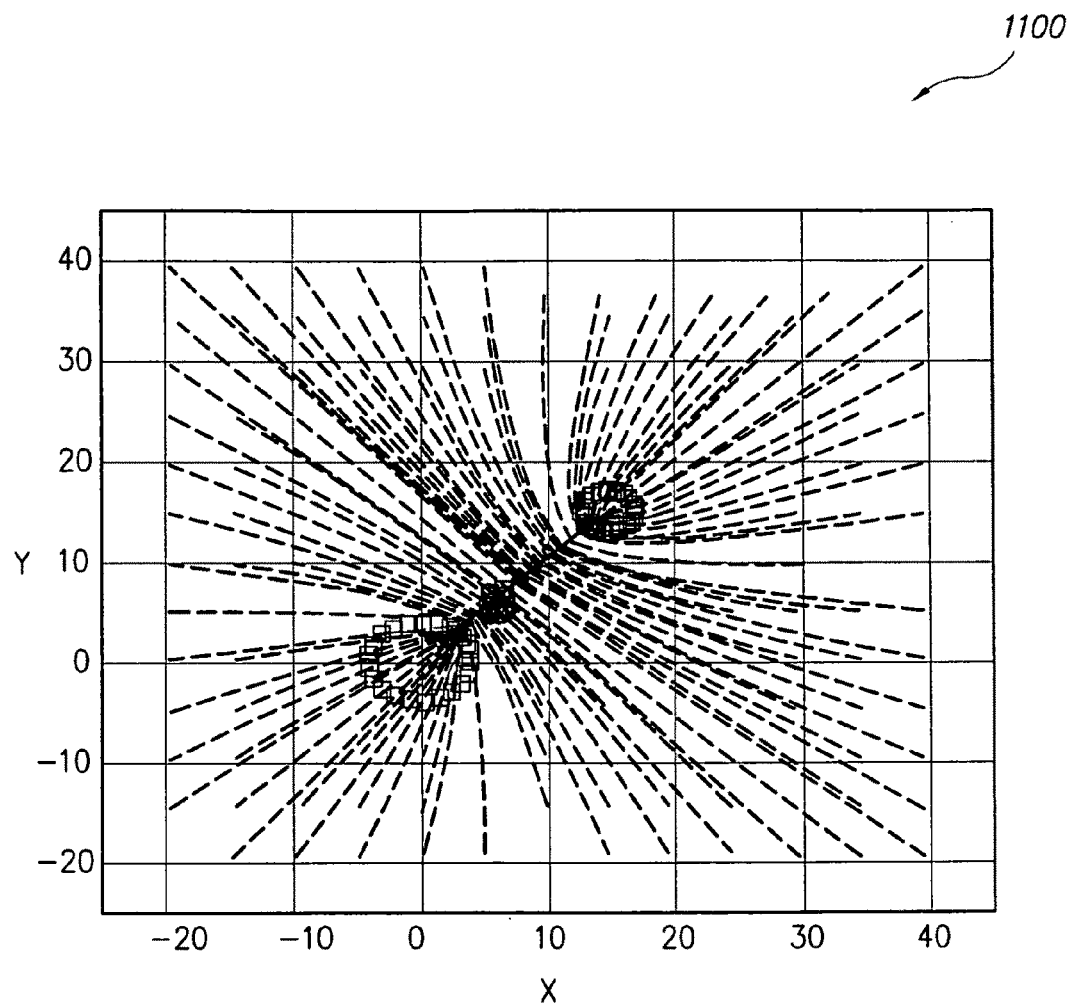
FIG. 11 is a graph showing paths taken by a positive particle dependent on a plurality of initial conditions using the facilities optimization method according to the present invention.

Finally, as shown in FIG. 7, we consider a scenario 700 with two positive particles with the same two groups of negative particles as in the previous example. As shown in FIG. 7 the two positive particles moved towards the groups of negative particles. Remember that the positive particles are repelling each other. They eventually reached equilibrium positions after 145 iterations as shown in graph 800 of FIG. 8.

This solution is clearly not optimal as maximum covering. It only satisfies a balance between supply and demand. To get the optimal solution, we use the other expression for the force magnitude (2). The results are shown in plot 900 of FIG. 9. In this case, the three positive particles start from the same positions and head toward exactly the centers of each group. The net forces converge to equilibrium as shown in graph 1000 of FIG. 10.

With regard to the robustness of the solution due to variation in some of the system's parameters, first, let us study the effect of changing the initial conditions on the solution obtained by the invention. To do that, we refer back to the case of two-demand groups and one-facility shown in FIG. 5. We run the simulation starting from various initial conditions. The results are shown in plot 1100 of FIG. 11. The broken lines show the path of the positive particles (the facilities). The initial conditions are chosen from a grid that spans the entire area. All of these paths end at exactly the same final solution. The result shown is typical in all tested scenarios. The aforementioned result indicates the robustness of the facilities optimization method in reaching the solution.

From another perspective, the parameters $a_1$ and $a_2$ of the equations of motion (5) and (6) should be small enough to avoid instability. An alternative and more effective way to solve the equations of motion is to use variable step-size or higher-order approaches, which can both improve stability and speed up the convergence to the equilibrium positions.

Another source of instability is when the distance between any of the particles is zero. This can be easily seen from the force equation (1) and the coverage equation (9). When $h_{ij}$ is zero, both $f_{ij}$ and $s_i(x,y)$ are infinite and therefore the solution becomes unstable. This problem can be easily resolved by preventing these quantities from going to infinity. One way to do so is to write $$|f_{ij}| = \frac{kg_i g_j}{h_{ij}^2 + \delta} \quad (12)$$

and $$s_i(x, y) = G_i \frac{1}{h_i^2(x, y) + \delta} \quad (13)$$

where δ is a small positive constant. Notice that we are not restricted by the original behavior of the charged particles.

Any suitable form of equations can be adopted to describe this behavior in order to get more efficient or practical solutions.

EXAMPLE

The placement of wireless communication base-stations is one of the important tasks in wireless network planning and design. It has a direct impact on the cost, quality-of-service, and maintainability of the network. This problem has been studied extensively in the literature and many solution approaches have been developed.

Figure 12:
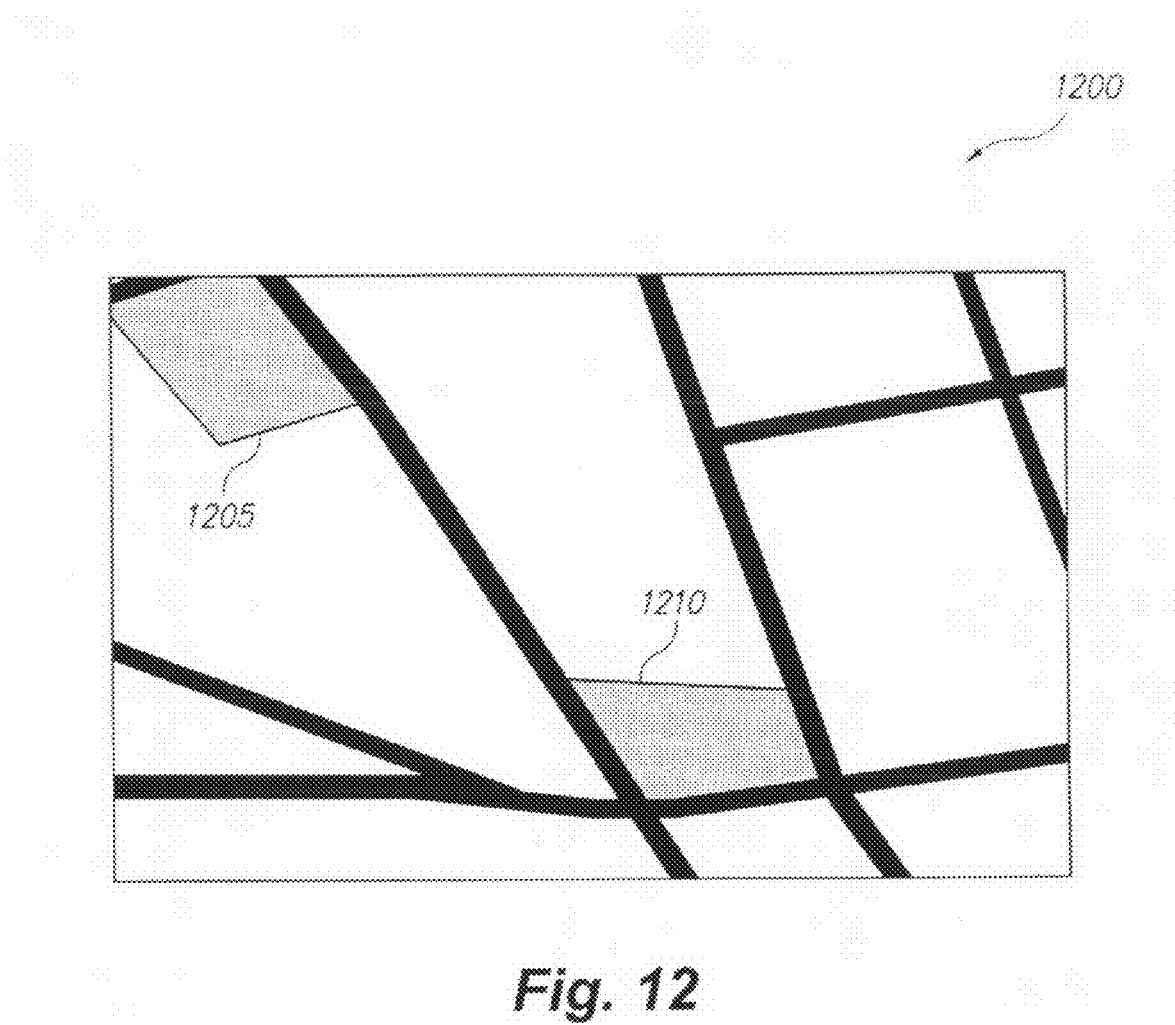
FIG. 12 is a chart showing demand levels for wireless services in an example illustrating the facilities optimization method according to the present invention.
Figure 13:
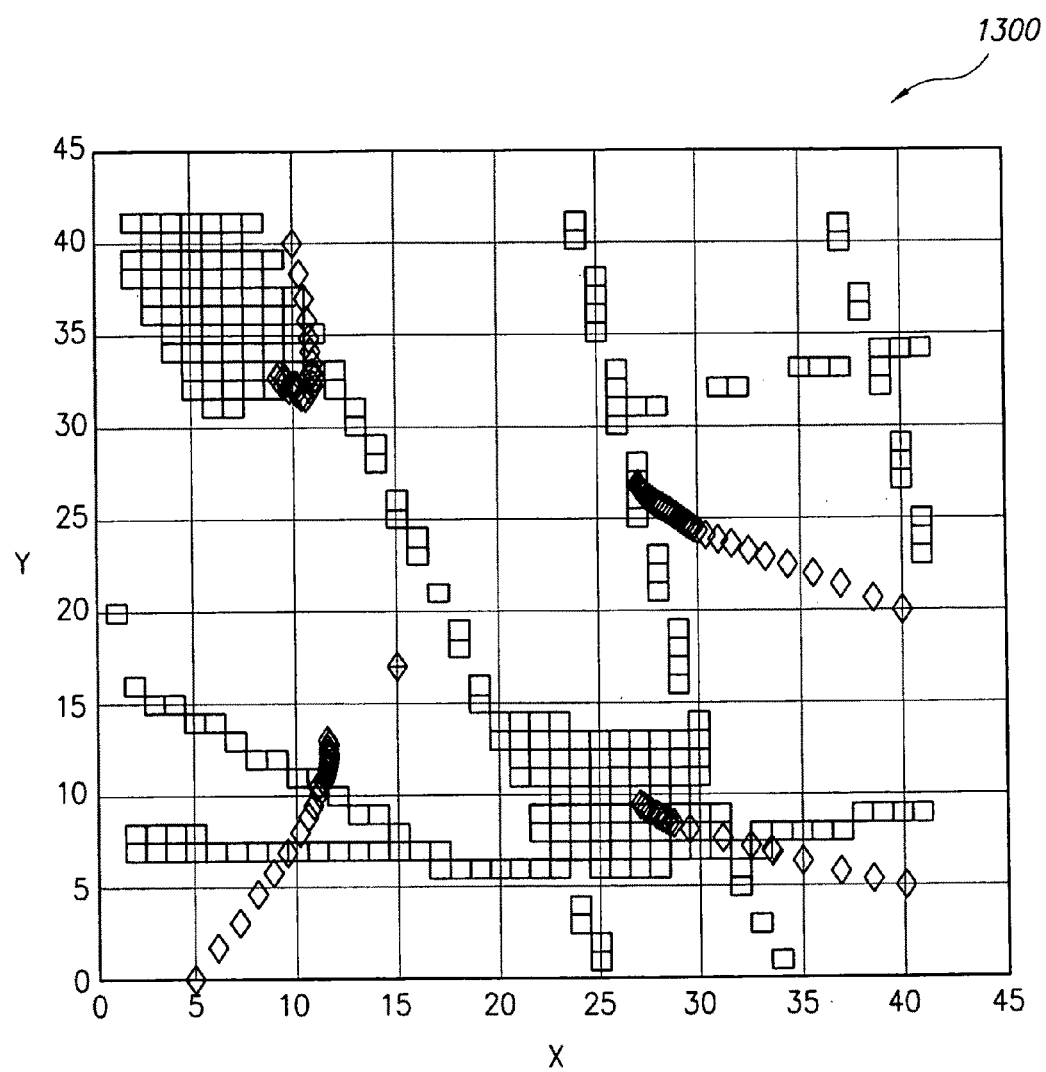
FIG. 13 is a chart showing movement of four wireless stations in an example illustrating the facilities optimization method according to the present invention.
Figure 14:
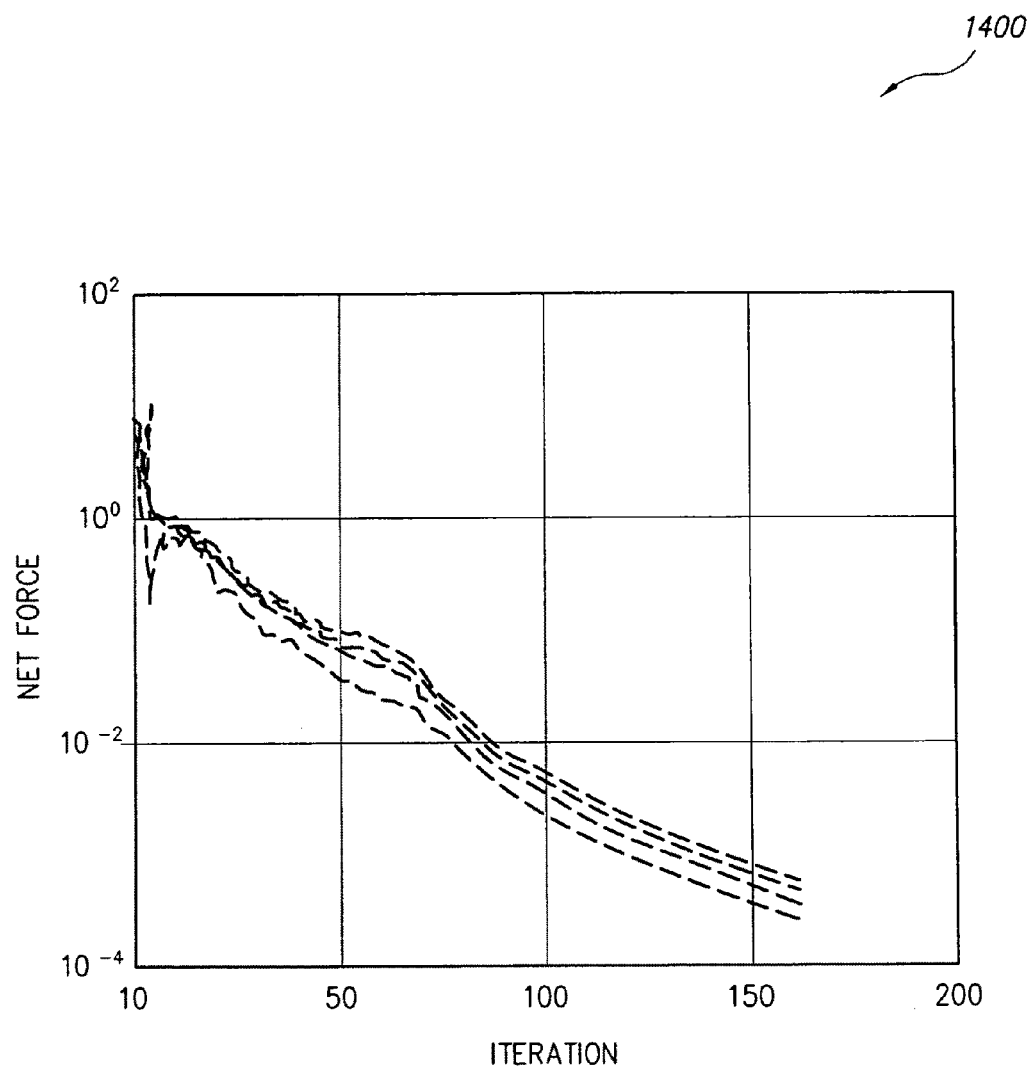
FIG. 14 is a graph showing net forces exerted on the wireless stations of FIG. 13 in an example illustrating the facilities optimization method according to the present invention.
Figure 15:
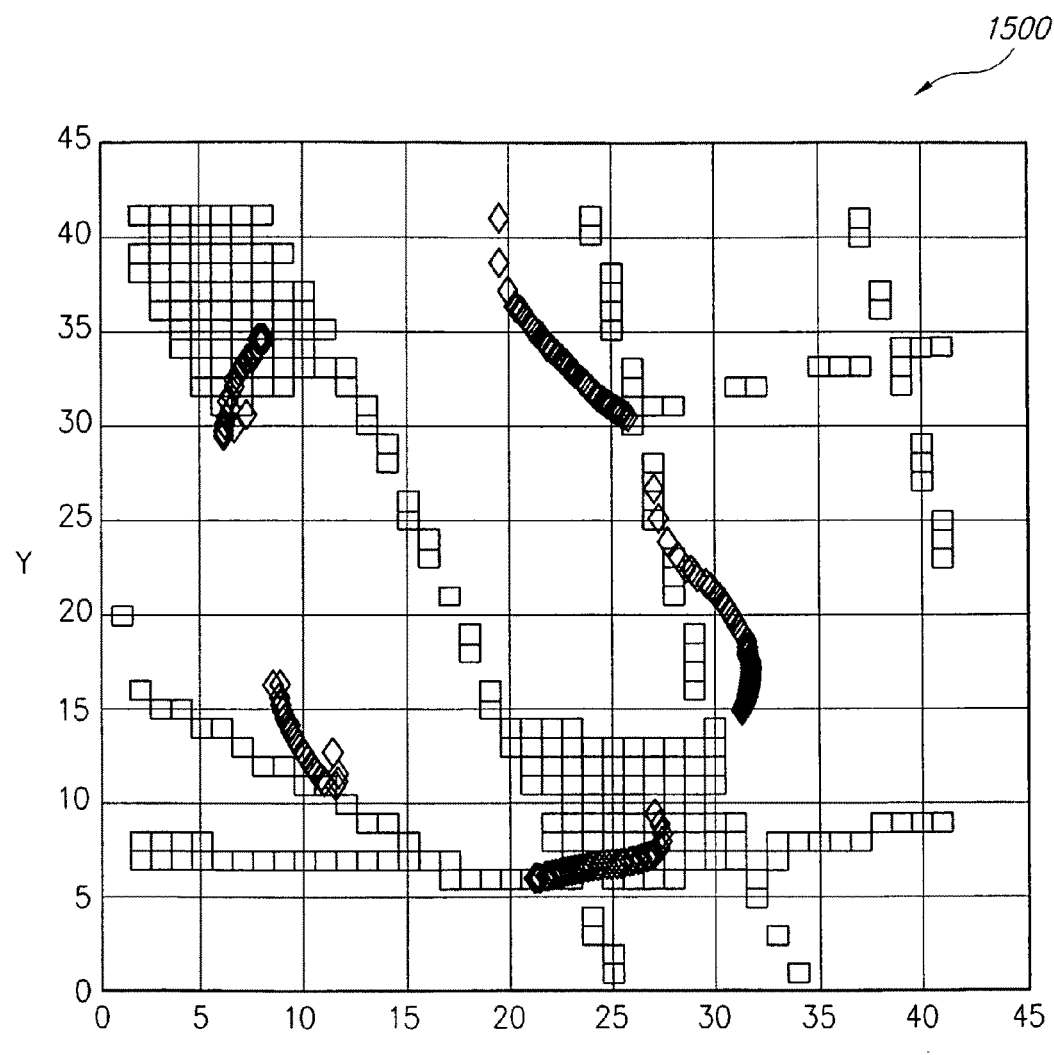
FIG. 15 is a graph showing new routes of the particles when a fifth wireless station is added in an example illustrating the facilities optimization method according to the present invention.

The objective is to compute the minimum number and location of wireless-tower stations inside a sector 1200 of the city shown in FIG. 12 such that the signal strength all over the demand space is above the threshold. The map shows a mesh of roads (dark lines) and two high-demand areas, namely, the downtown 1205 and the shopping area 1210. The demand areas are represented by the negative particles while the tower stations (facilities) are represented by positive ones. The values of the demand points are chosen arbitrarily as shown in Table I. A first shading on the map corresponds to highest demand with weight equal to −20 followed by a second shading with a weight of −10. The unshaded portion indicates normal demand and a third shading means prohibited areas. Notice that the third shading is given positive weight in order to repel the facilities away from that area.

TABLE 1

Pattern Codes and Their Corresponding Values for the Demand Points

| Shade | Demand Level | Demand Value |
| --- | --- | --- |
| Grey | Highest | −20 |
| Black | High | −10 |
| White | Normal | 0 |

After constructing the demand points, we start by placing four facilities in arbitrary initial positions. The facilities start to move in different directions affected by the other demand and facility points. The facilities eventually reach an equilibrium state as shown in plot 1300 of FIG. 13. Two stations are attracted to the high-demand areas while the remaining two are covering the remaining area on the map. The curves for net forces of all facilities are shown in graph 1400 of FIG. 14. In this case the facilities converge to an equilibrium in approximately 140 iterations.

Figure 16:
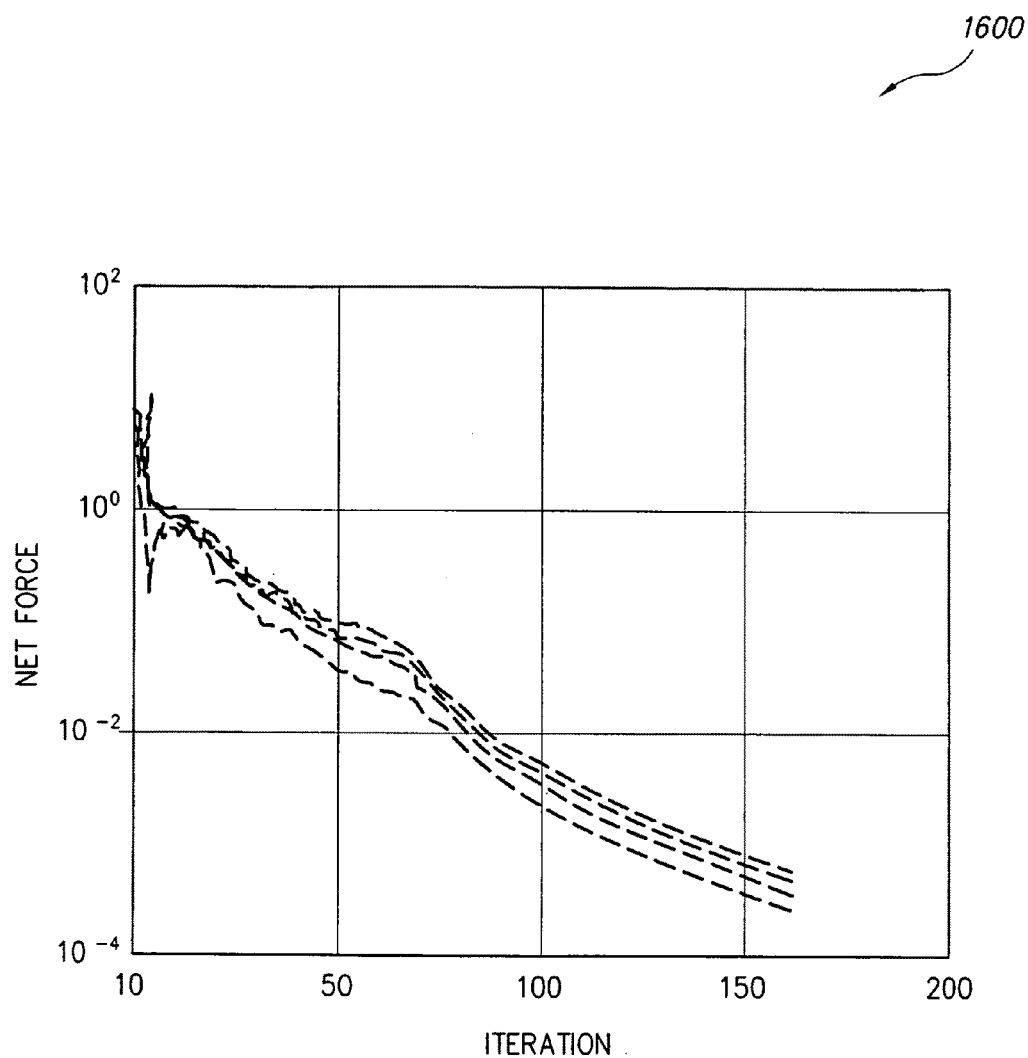
FIG. 16 is a graph showing net forces exerted on the five wireless stations of FIG. 15 in an example illustrating the facilities optimization method according to the present invention.

The next step from FIG. 2 is to measure the service level across the coverage space as discussed in coverage problem solving section. In this case, equation (10) is used for measuring the service level. It was found that there are still some areas with service levels less than the threshold. Therefore, one extra facility is placed in an arbitrary location. As a consequence, all facilities start to move again to new equilibrium positions, which are shown in plot 1500 of FIG. 15. The convergence plot 1600 for this new setup is shown in FIG. 16. The service level all over the space is measured again, which is now found to be above the threshold. Therefore, the simulation is terminated and the results are reported. In this case, five stations with locations shown in FIG. 15 were enough to cover the entire space with the required service level.

The facilities optimization method may be used to satisfy demand using supply facilities, to find the best location of supply facilities given arbitrary demand patterns, to find the best number of supply facilities given arbitrary demand patterns, and the like.

It is to be understood that the present invention is not limited to the embodiment described above, but encompasses any and all embodiments within the scope of the following claims.

I claim:

1. A computer product for facilities optimization comprising a medium readable by a computer, the medium having a set of computer-readable instructions stored thereon executable by a processor when loaded into main memory, the instructions including:

simulating a physical phenomenon of charged particle interaction, thereby producing a charged particle interaction simulation;

assigning a first charge of first charge type particles to users of service supplying facilities;

assigning a second charge of second charge type particles to the service supplying facilities;

disposing a first plurality of the user particles and a second plurality of the facility particles in an initial configuration within the simulation;

constraining a first of the first and second pluralities of particles to their initial configuration;

allowing a second of the first and second pluralities of particles to move, said second of the first and second pluralities of particles finding an equilibrium state with respect to the first of the first and second pluralities of particles; and iteratively performing the previous steps while varying first plurality and second plurality of particles, the iterative performance of the simulation settling into an optimum location and number of supply points associated with the facility particles with respect to demand points associated with the user particles.

2. The computer product according to claim 1, wherein the first of the first and second pluralities of particles are the user particles and the second of the first and second pluralities of particles are the facility particles.

3. The computer product according to claim 1, wherein the simulating step further comprises the step of calculating particle interactions based on Coulomb's law, the particle interactions calculating step including evaluating the equation for particles i, j, and w as follows;

$$|f_{ij}| = \begin{cases} \frac{kg_i g_j}{h_{ij}^2}, & \mathrm{argmax}_w \left\{ \frac{kg_w g_j}{h_{wj}^2} \right\} = i \\ 0, & \text{Otherwise} \end{cases} \quad (2)$$

wherein $g_i$ and $g_j$ are the amounts of charge for particles i, j and w respectively and k is a degradation factor, the parameter $h_{ij}$ being the distance between the two particles.

4. The computer product according to claim 1, wherein said instructions further include calculating a force direction for each pair of particles by evaluating the equation:

$$u_{ij} = \frac{1}{(x_i - x_j)^2 - (y_i - y_j)^2} [(x_i - x_j)(y_i - y_j)],$$

wherein $u_{ij}$ is a unity vector, $x_i$, $x_j$, $y_i$, $y_j$ are Cartesian coordinates of the $i_{th}$ particle and the $j_{th}$ particle respectively.

5. The computer product according to claim 4, wherein said instructions further include calculating a net force applied to any particle in the simulation by evaluating the equation, $$f_i = \Sigma_{j=[1,M], j \neq i} |f_{ij}| u_{ij},$$

wherein M is the total number of particles.

6. The computer product according to claim 5, wherein said instructions further include calculating particle velocities and particle displacements by evaluating the equations, $v_i(t+\Delta)=v_i(t)+a_1 f_i(t)$, and $p_i(t+\Delta)=p_i(t)+a_2 v_i(t)$, respectively, wherein $v_i$ is the velocity of the $i_{th}$ particle, $p_i$ is the displacement of the $i_{th}$ particle, t is time, $\Delta$ is a computation step-size, and constants $a_1$ and $a_2$ are dependent on the computation step size.

7. The computer product according to claim 4, wherein said instructions further include minimizing the number of facilities and their locations such that a service level all over an entire space $\Gamma$ is at least equal to a constant threshold $\alpha$, thereby fulfilling a criteria, min N, such that
$r(x,y) \geq \alpha \; \forall x,y \in \Gamma$, wherein N is the number of facilities and r(x,y) is a net service level offered at a point having the coordinates (x,y).

8. The computer product according to claim 7, wherein said instructions further include:
evaluating a first quantity, $$s_i(x, y) = G_i \left(\frac{1}{h_i(x, y)}\right)^2,$$

the first quantity being an amount of coverage supplied by the $i_{th}$ facility to the demand point at location (x,y)
evaluating a second quantity, d(x,y), the second quantity being a demand value represented in the simulation as the amount of charge carried by the negative particles; and
evaluating $r(x,y)=\Sigma_{i=1}\{s_i(x,y)\}-d(x,y)$, wherein r(x,y) is the difference between supply and demand.

9. The computer product according to claim 7, wherein said instructions further include evaluating the equation $r(x,y)=\max\{s_i(x,y)\}-d(x,y)$, wherein each demand point is covered satisfactorily by at least one of the facilities.

10. The computer product according to claim 7, wherein said instructions further include:
placing a first positive particle at an arbitrary site inside a field;
allowing the particle to begin moving towards the demand particles via a force of attraction defined by the simulation;
measuring the net field strength (service level) all over the area;
terminating the simulation with a solution if the net field strength is above the threshold $\alpha$ for all points;
placing a second positive particle at an arbitrary site if the net field strength is below the threshold $\alpha$ for all points; and
repeating the previous steps in this claim until the simulation ends on condition of the terminating step.

11. The computer product according to claim 1, wherein said instructions further include producing a color-coded demand pattern, wherein color codes of the demand pattern facilitate observation of the solution by a user of the simulation.

12. The computer product according to claim 11, wherein the color codes comprise representations of a priority level category, a population density category, and a service category.

13. The computer product according to claim 12, wherein a color code includes a combination of more than one of the categories.

* * * * *